May 21, 1963 R. E. NOVKOV 3,090,104
OBLIQUELY SHIFTABLE CUTTING TOOL
Original Filed Dec. 20, 1956
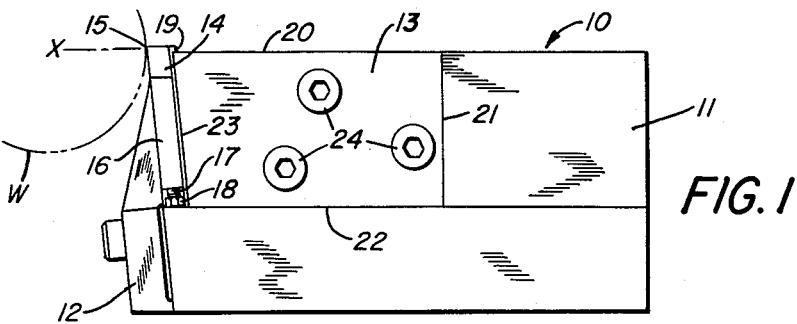
FIG. 1
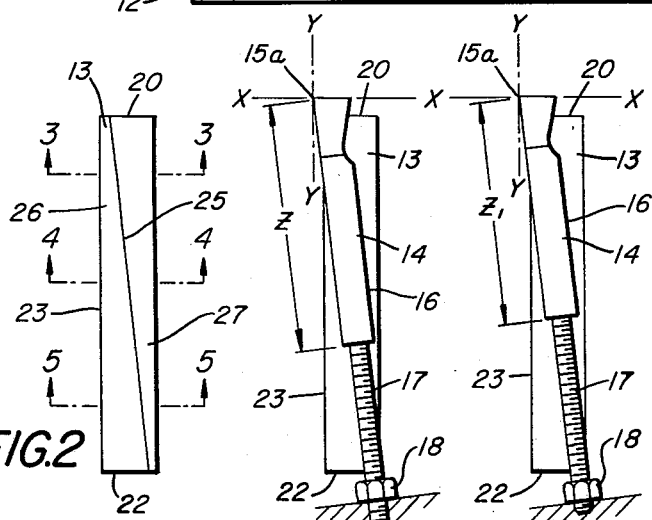
FIG. 2 FIG. 6 FIG. 7
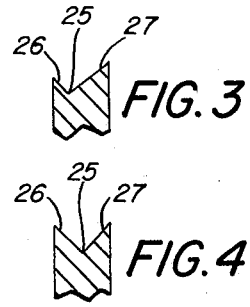
FIG. 3
FIG. 4
FIG. 5
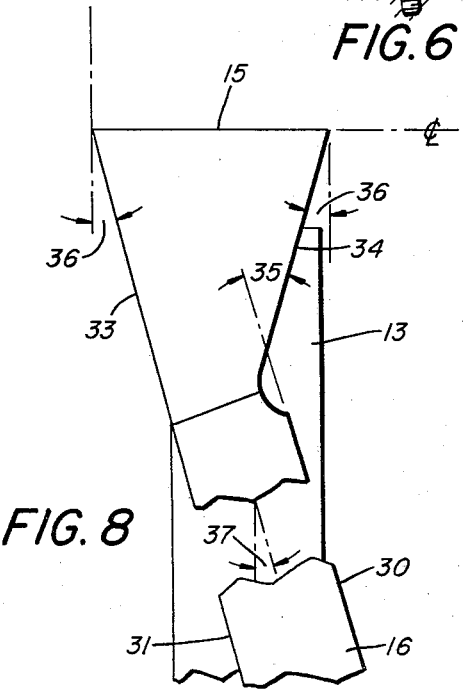
FIG. 8
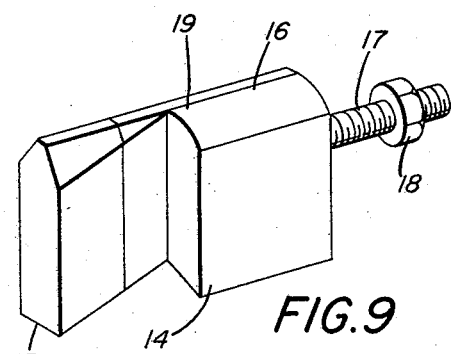
FIG. 9
INVENTOR.
RAYMOND E. NOVKOV
BY J. William Freeman
ATTORNEY

United States Patent Office 3,090,104
Patented May 21, 1963

3,090,104
OBLIQUELY SHIFTABLE CUTTING TOOL
Raymond E. Novkov, Cuyahoga Falls, Ohio, assignor to Manchester Machine & Tool Co., Akron, Ohio, a corporation of Ohio
Continuation of abandoned application Ser. No. 629,642, Dec. 20, 1956. This application Apr. 22, 1960, Ser. No. 24,174
2 Claims. (Cl. 29—96)

This invention relates to machine tools and in particular relates to an improved type of cut-off or parting tool having particular utility in connection with lathes or other turning equipment of known construction.

It has long been known in the prior art that a length of work can be cut or trimmed into a stronger length during the supported rotational movement thereof by the application of a cutting tool against the rotating external surface of the work.

In the great majority of cases such cut-off operations are effectuated by the use of a lathe with the work being rotatably supported about its axis of rotation over the lathe bed while the cut-off tool is secured to the crossslide so as to move transversely of the lathe bed and thus engage the rotating work. Respective cutting tools of this general type are set forth in copending applications, Serial Nos. 505,488, now patent No. 2,846,756 issued August 12, 1958, and 557,785, now patent No. 2,897,579 issued August 4, 1959, filed May 2, 1955 and January 6, 1956, respectively, by Raymond E. Novkov.

In both of the above referred to applications, there was disclosed the use of an elongated tool bit that was supported with respect to the lathe bed by a thin support blade that was attached to a tool holder. Additionally, in both of these cases the cutting bits illustrated were shown provided, in accordance with the prior art teachings, with equal side rake angles that extended inwardly of the cutting edge toward the shank portion.

It has been found, however, that in use of elongate cutting bits of this type, certain disadvantages will occur during repetitive cut-off operations wherein a considerable number of pieces are all to be cut to the same length. Specifically, it is a requirement of such bits that the same be periodically sharpened to restore the cutting edge thereof. Such sharpening is effectuated by a grinding operation that, in effect, shortens the overall elongate length of the bit by cutting off a portion of the cutting edge.

While such a procedure is generally accepted as proper machine tool practice, it is believed apparent that the above described operation operates to decrease the width of the cutting edge due to the fact that the side surfaces defining the same are disposed so as to define opposed rake angles. Thus, as more and more cutting edge is ground off, the cutting edge itself will decrease in width, with the result that unless the lathe is reset to compensate for this decrease in width, the parts cut after grinding will be longer than the parts cut prior to the grinding operation. It is believed apparent that it will, accordingly, be necessary, after each grinding operation, to reset the cutting tool.

It has been discovered that the aforementioned difficulties can be obviated by eliminating the side rake angle on one side surface of the cutting bit and doubling the side rake angle on the remaining side surface of the cutting bit.

This structural modification, coupled with oblique shifting of the bit with respect to a support blade therefor, will insure that the cutting edge will always be disposed in the same cutting plane both prior to and subsequent to a sharpening operation.

It, accordingly, becomes the principal object of this invention to provide an improved type of cutting bit featuring a modified form of side rake clearance angle.

It is a still further object of this invention to provide an improved type of cutting bit, together with a support therefor, with the component parts being maintained in a uniform cutting plane regardless of whether or not a sharpening operation has occurred.

These and ohter objects of the invention will become more apparent from a reading of the following brief specification, considered and interpreted in the light of the accompanying drawings.

Of the drawings:

FIGURE 1 is a side elevational view showing the improved tool bit and support blade therefor.

FIGURE 2 is a front elevational view of the improved support blade.

FIGURES 3, 4 and 5 are sectional views taken on the lines 3,3; 4,4; and 5,5 of FIGURE 2.

FIGURES 6 and 7 are front elevational views illustrating the position of the tool bit on the support blade prior to and after a sharpening operation.

FIGURE 8 is an enlarged detail showing the relationship between the tool bit and the support blade.

FIGURE 9 is a perspective view of the improved tool bit.

Referring now to the drawings and in particular to FIGURE 1 thereof, the improved cut-off tool, generally designated by the numeral 10, is shown including a tool body 11 to which is fixedly secured a clamping block 12 and a support blade 13, the arrangement being such that body 11, block 12 and blade 13 coact together, as will presently be described, to support a cutting bit 14, so that the cutting edge 15 thereof can be disposed in alignment with the axis of rotation X of a revolving work piece W to effectuate a cut-off operation on the same.

Because the improvement herein recited relates primarily to the improved construction and interconnection between the support blade 13 and the cutting bit 14, a detailed recitation of the structure of the tool body 11 and the clamping block 12 will not be set forth herein, it being understood that a tool body and clamping block of the type set forth in copending application Serial No. 557,785, filed January 6, 1956, by Raymond E. Novkov, may be used with satisfactory results.

Turning now to a consideration of the detailed structure of the support blade 13, it will be seen from the drawings, and particularly FIGURE 1 thereof, that the same is of flat configuration so as to include a top edge 20, a rear edge 21, a bottom edge 22, and a leading or forward edge 23, with the edge 23 being designed to seat the cutting bit 14 while the support blade 13 per se is attached to the tool body 11 by use of bolts 24, 24.

To the end of supporting bit 14, the forward edge 23 may include a V-shaped groove indicated generally by the numeral 25 in FIGURE 2 of the drawings, with groove 25 being canted so as to extend obliquely between the opposed parallel surfaces 20 and 22.

The canting of the groove is best shown in FIGURES 3 and 5 wherein the various widths of the sidewalls 26 and 27 are shown increasing and decreasing from top to bottom of the edge portion 23, with the side wall 26 being narrowest adjacent the top, while the side wall portion 27 has its narrowest width adjacent its point of contact with the lowermost edge portion 22.

Referring now to FIGURES 8 and 9 for a detailed description of the cutting bit 14, it will be seen that the same, as has been previously indicated, is of elongate configuration so as to include a cutting edge 15, a shank portion 16, and a threaded stud portion generally indicated by the numeral 17, upon which an adjustment nut 18 may be received as shown in FIGURES 1 and 9 of the drawings. In addition to the aforementioned component parts, the bit 14 includes a V-shaped edge 19 that extends longitudinally of the cutting edge 15 equi-distant of the opposed side edges 30 and 31. In this manner, the V-shaped projection 19 will be received within the groove 25 so that the cutting bit 14 will slide obliquely of the edge portion 23 as shown in FIGURES 6 and 7 of the drawings.

Considering next the detailed construction of the cutting edge 15 as the same is best illustrated in FIGURE 8 of the drawings, it will be seen that the same is preferably abutted longitudinally of the shank portion 16 and is illustrated in the preferred embodiment of the invention as being of a different material than the shank portion 16, with these parts being longitudinally fused together in the manner set forth in copending application, Serial No. 505,488, filed May 2, 1955, by Raymond E. Novkov.

In order that the proper amount of rake angle may be provided for the cutting tool 14, the side edge portion 33 of the cutting edge 15 is shown as being coplanar with the side edge portion 31 of shank 16 so that a continuous edge portion is provided along one side of the tool. By way of contrast, the opposed side edge 34 of the cutting edge 15 is shown inclined with respect to the side edge 30 by angle 35 with angle 35 being approximately double the normal rake angle provided in such types of cutting bits. In this manner, the side edges 33 and 34 are disposed at equal rake angles 36, 36, with respect to edge 15, with the sum of the rake angles 36, 36 preferably equalling the angle 35.

In normal practice relative to the angular dimensions employed, the angle 37, representing the degree that the slot 25 is canted, will equal each angle 36 and will be in the nature of approximately 2 degrees, while the angle 35, representing the degree of inclination of the side surface 34, with respect to the side surface 30, will be approximately double this angle, or approximately 4 degrees.

The use or operation of the improved cutting tool can best be understood by first referring to FIGURES 6 and 7 and assuming that the line Y—Y represents, in each case, the point of cut-off of the revolving pieces, while the line X—X indicates the height of the axis of rotation of the revolving work piece W. Accordingly, as shown in FIGURE 6, a tool bit of length Z, is supported against the blade 13 so that the left-hand portion 15a (FIGURE 6) of cutting edge 15 is coincident with the lines Y—Y and X—X. In this manner, a revolving work piece may be cut off at the lines Y—Y.

When the tool has become dull and it is desired to sharpen the same, it is merely necessary that the same be removed and the edge portion thereof ground off until a shorter length, represented by the dimension $Z_1$ (FIGURE 7) is obtained. At this point, the tool may be replaced against the leading edge 23 of support blade 13 and the nut 18 adjusted downwardly to the proper height for engagement with the tool body 20. As a result of this adjustment of the nut 18, it is believed apparent that the new cutting edge 15 will have been moved obliquely upwardly and to the left of FIGURE 7 so that the same has its extreme edge portion 15a in alignment with the planes X—X and Y—Y, with the degree of rake angle from the plane Y—Y being the same as before, and with the cutting edge 15 being disposed throughout the plane X—X so that an equal rake angle is provided on both sides.

It will be seen from the foregoing how there has been provided a new and improved manner of supporting a cutting bit with respect to a support blade wherein the cutting bit is moved obliquely of the edge of the support blade so as to continuously maintain its cutting edge in two critical planes without the necessity for resetting the machine after sharpening.

It has been further shown how this canting of the bit with respect to the support blade permits a double rake angle to be provided on one side of the cutting bit while the other side thereof is devoid of any rake angle, with the rake angle for this side during the cutting operation being provided by the oblique positioning of the cutting bit.

It is to be noted that in the preceding paragraphs, the invention has been described wherein the oblique angle is provided upon the support blade. It is to be understood, however, that the identical result could be obtained by canting the V-shaped projection on the tool bit while providing a straight groove on the leading edge of the support blade.

Thus, while a detailed description of the invention has been set forth in accordance with the dictates of the Patent Statutes, it is to be understood that the invention is not intended to be so limited.

Accordingly, modifications of the invention may be resorted to without departing from the spirit hereof or the scope of the appended claims.

This application is a continuation-in-part of copending applications, Serial Nos. 505,488 and 557,785, filed May 2, 1955, and January 6, 1956, respectively, by Raymond E. Novkov.

This application is a continuation of the application of Rayond E. Novkov, Serial No. 629,642, filed December 20, 1956, now abandoned.

What is claimed is:

1. A cutting tool of the character described, comprising; a tool body, a support blade supported with respect to said tool body and having opposed sides and a bit receiving edge surface of elongate configuration; first elongate guide means defined by said bit receiving edge surface and extending longitudinally and diagonally thereof; an elongate cutting bit having a cutting edge at one longitudinal end thereof and further having a longitudinal center line; second elongate guide means defined by said bit and extending longitudinally thereof in substantial parallelism with said longitudinal center line; means releasably clamping said first and second guide means into complemental engagement with each other, whereby said bit is longitudinally and diagonally disposed on said bit receiving surface of said blade; said cutting edge being disposed substantially normal to at least one of said opposed sides of said blade when said first and second guide means are complementally engaged.

2. The device of claim 1 further characterized by the fact that said bit is defined by longitudinally abutted shank and tip portions, each of which has opposed sides; one of said opposed sides of said tip being disposed in substantially coplanar relationship with respect to one said side surface of said shank, while the remaining opposed side surfaces of said bit are inclined at an acute angle with respect to the major portion of the remaining opposed side surface of said shank.

References Cited in the file of this patent

UNITED STATES PATENTS

| | | |
|---|---|---|
| 1,667,801 | Hawkes | May 1, 1928 |
| 2,243,239 | Zazerda | May 27, 1941 |
| 2,398,913 | Anthony | Apr. 23, 1946 |
| 2,595,090 | Middleton | Apr. 29, 1952 |
| 2,683,302 | Bader | July 13, 1954 |
| 2,697,866 | Greenleaf | Dec. 28, 1954 |
| 2,716,799 | Bader | Sept. 6, 1955 |
| 2,737,705 | Novkov | Mar. 13, 1956 |

FOREIGN PATENTS

| | | |
|---|---|---|
| 887,592 | Germany | Aug. 24, 1953 |
| 568,876 | Great Britain | Apr. 24, 1945 |
| 299,500 | Italy | Aug. 4, 1932 |